United States Patent [19]

Van der Veer

[11] Patent Number: 4,829,933

[45] Date of Patent: May 16, 1989

[54] DEVICE FOR SUPPLYING SMALL LIVESTOCK WITH DRINKING WATER

[75] Inventor: Harry M. Van der Veer, Heerde, Netherlands

[73] Assignee: Farmtec B.V., Heerde, Netherlands

[21] Appl. No.: 224,003

[22] Filed: Aug. 11, 1988

Related U.S. Application Data

[63] Continuation of Ser. No. 924,351, Oct. 29, 1986, abandoned.

[30] Foreign Application Priority Data

Oct. 30, 1985 [NL] Netherlands .................... 8502963

[51] Int. Cl.⁴ .............................................. A01K 7/00
[52] U.S. Cl. ........................................ 119/78; 119/80
[58] Field of Search ................. 119/78, 79, 80, 72.5, 119/78; 137/434, 442, 418, 416, 448

[56] References Cited

U.S. PATENT DOCUMENTS

| | | | |
|---|---|---|---|
| 1,918,566 | 7/1933 | Sadleir | 119/75 |
| 2,594,968 | 4/1952 | Miller | 119/72.5 |
| 2,618,237 | 11/1952 | McDermott et al. | 119/80 |
| 3,405,687 | 10/1968 | Rüter | 119/78 |
| 3,415,229 | 12/1968 | Myers | 119/80 |

*Primary Examiner*—Robert Peshock
*Attorney, Agent, or Firm*—Abelman Frayne Rezac & Schwab

[57] ABSTRACT

A water trough for emergent chicks and maturing chickens includes a float operated actuator for a drinking nozzle which can be manually activated to provide water in a drinking trough for emergent chicks, and which can be manually disabled on maturing of the chickens to force the maturing chickens to drink from the drinking nozzle.

3 Claims, 4 Drawing Sheets

DEVICE FOR SUPPLYING SMALL LIVESTOCK WITH DRINKING WATER

This application is a continuation of application Ser. No. 924,351, filed Oct. 29, 1986, now abandoned.

The invention relates to a device for supplying small livestock, in particular poultry, such as fattening chickens or breeding chickens, with drinking water, said device comprising a pipe with several self-closing drinking elements or drinking nipples, said nipple pipe being connected to a water supply or water pipe, with a drain trough being disposed under the nipple pipe, while the nipple pipe together with the drain trough is adjustable in height. A forerunner of the modern nipple pipe, of the type used virtually everywhere in batteries for laying hens, is described in U.S. Pat. No. 1,918,566. The advantage of devices provided with a nipple pipe over the use of drinking fountains for providing small livestock with water is that the water is not contaminated, which means that there is less likelihood of diseases occuring among the livestock.

A disadvantage of this known device for supplying water to a small livestock is that it is not suitable for chicks, with the result that, depending on the size of the poultry, the drinking water supply has to be adjusted. One-day-old chicks are therefore generally still always provided with a vessel with drinking water, since they have to see the water; the chicks have to learn to drink water from the nipples of a nipple pipe, and this takes some time. What is important for the drinking fountains for chicks is that they should be designed in such a way that the chicks cannot drown in them. Besides, such drinking fountains quickly become contaminated and need regular filling up and cleaning, which involves a large amount of extra work.

U.S. Pat. No. 2,594,968 discloses a drinking water facility for small livestock which is adjustable in height. This makes it possible to adapt the height of drinking water supply to the size of the poultry. For the chickens to be able to drink at the nipples, the latter have to be disposed at the correct height. A disadvantage of this known device is that it is not suitable for one-day-old chicks, since—as stated above—they have to see the water and be taught to drink at nipples. In the device, described in the aforementioned U.S. Pat. No. 2,594,968, water will not always be present in the drain trough in any position of the said trough.

The object of the invention is to provide a device for supplying small livestock with water, wherein the same device can be used both for one-day-old chicks and for chickens during their growth.

The object is achieved with a device according to the invention, in that means are present which in the lowest position of the nipple pipe fill the drain trough with water to a particular desired maximum height, so that the drain trough in that position is always filled with water and can serve as a drinking fountain for chicks. In this way it is possible to use the device according to the invention directly after the hatching of the chicks, thus for one-day-old chicks, up to the time when they are ready for slaughter or sale. One advantage of this device according to the invention is that if it is used as a drinking fountain for chicks, the chicks cannot so easily pollute the water, through the fact that the nipple pipe runs above the drinking fountain over its entire length, which prevents the chicks from climbing into the drinking fountain.

For filling the drain trough with water, it is preferable to use means containing a member which holds one drinking nipple in the open position until the level of the water in the drain trough has risen to a particular desired level, and the member is then placed with the aid of means, such as a float or floating element, in such a position that the drinking nipple can close again. Such an operating element of the drinking nipple can consist of a lever which is fastened so as to be tiltable or rotatable about a shaft, and the lever consists of both an arm which extends at one side from the tilting shaft and whose extremity is provided with a floating member, and an arm which extends at the other side from the tilting shaft and whose extremity can operate a nipple pin of a nipple. The advantage of these measures according to the invention is that a nipple of the nipple pipe also serves as an inflow opening for the water to the drinking fountain to keep water in it constantly, and therefore no separate facilities, such as a valve, need to be used.

Moreover, the chicks see where the water is coming from and will thereby quickly learn to use the nipples, with the result that it will soon no longer be necessary to have water constantly standing in the drain trough.

In the preferred embodiment of the device according to the invention, the part near the extremity of the arm coming into contact with the nipple pin in any position forms an angle with the horizontal, in such a way that near the extremity of the arm the said part slopes towards the extremity. In this way, the chicks see that water is dripping out of the nipple serving for the water infeed, and they are invited to drink, so that the chicks are already used to this before being transferred to a laying battery. This is very important, since nipple pipes with drinking nipples are used in virtually all laying batteries.

With the use of a device according to the invention, chicks will generally learn very quickly that by pressing the nipples a quantity of water can be obtained, and the facility for filling the drain trough with water can soon be removed. For this, the device is provided with means which put the lever out of action if the nipple pipe together with the drain trough is taken to a position higher than the bottom one. Only in the bottom position, which is used only when the chicks are still very small, is the drain trough filled with water; thereafter the chicks can drink only from the nipples of the nipple pipe.

For putting the lever out of action, the means can comprise a longitudinal hole in which the shaft of the lever can be moved more or less vertically over a certain distance, and a stop against which the operating arm comes to rest in the highest position of the shaft, so that in the highest position of the shaft the extremity of the arm can not come into contact with the nipple pin of the nipple. This therefore means that the drain trough serves as a drinking fountain only in the bottom position, thus for one-day-old chicks. If the nipple pipe is placed in a higher position, the drinking fountain is no longer filled with water and thus serves as a drain trough.

The presence of a drain trough under the nipples is very important and helps the chicks to keep dry and the chicken droppings to dry out on the battery.

The invention will be explained in greater detail with reference to the drawing:

Figure 1:
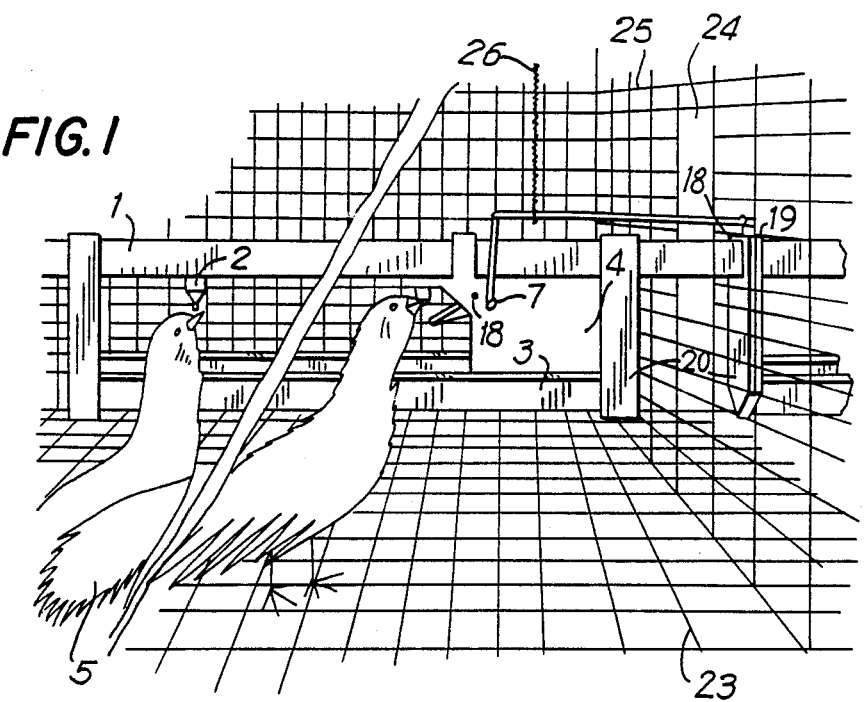
FIG. 1 shows a view of a part of a device according to the invention.

FIG. 1 shows a part of a device according to the invention. Located under the nipple pipe 1, with nipples 2, is a drain trough of drinking fountain 3. In the lowest position of the nipple pipe 1, the drain trough 3 can be filled with water to a particular level, with the aid of means 4. The drain trough 3 then serves as a drinking fountain for chicks 5. In the device shown in FIG. 1 the nipple pipe 1 is no longer in the lowest position; the chicks 5 are already big enough to drink from the nipples 2.

Figure 2:
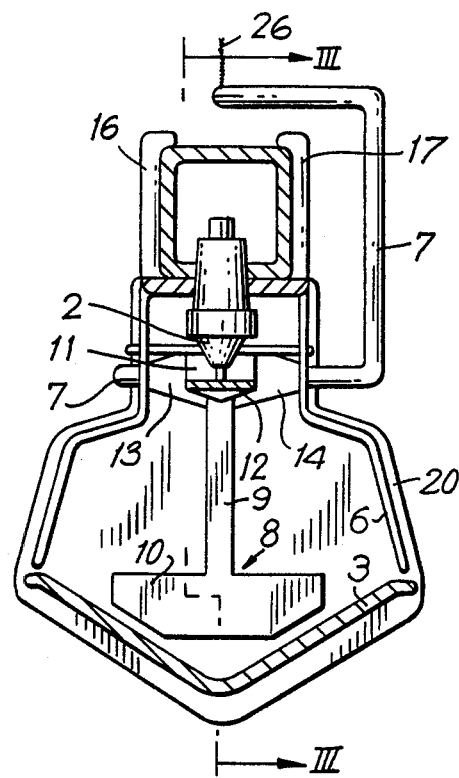
FIG. 2 shows a cross-section of the device according to the invention along the line II—II of FIG. 3.
Figure 3:
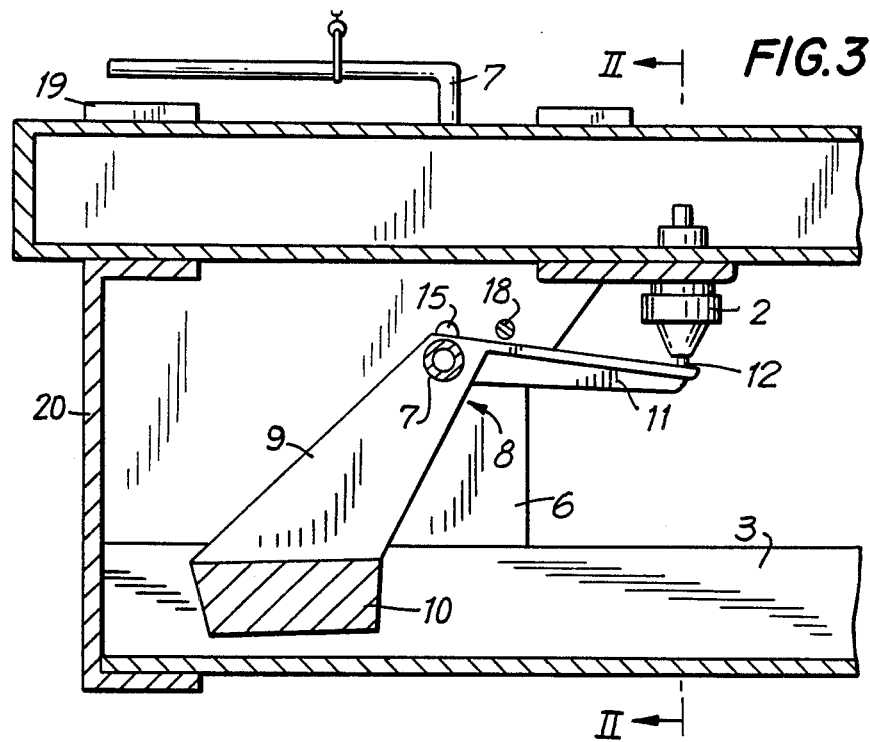
FIG. 3 shows a cross-section of the same device according to the invention, as shown in FIG. 2 along the line III—III.
Figure 4:
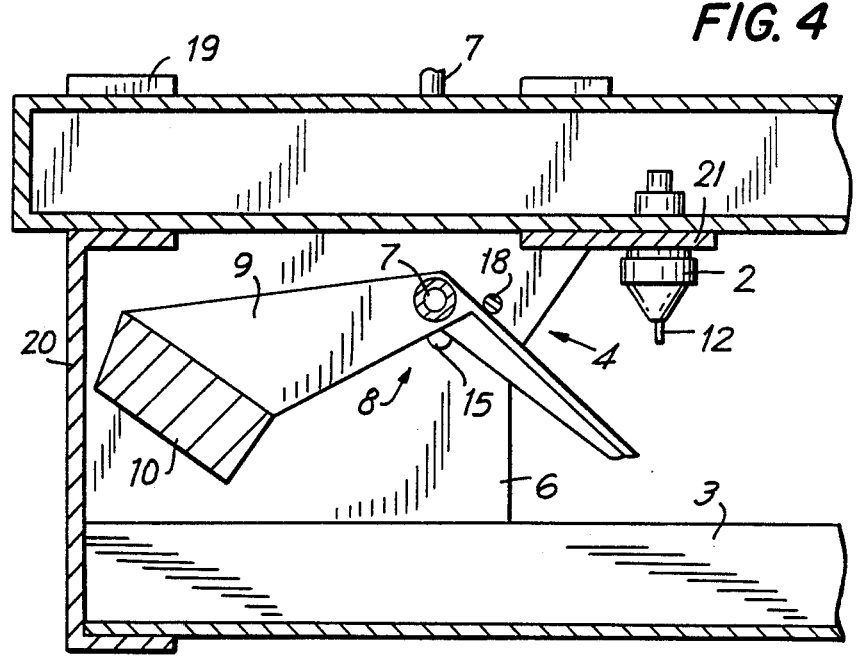
FIG. 4 shows a cross-section of the device shown in FIGS. 2 and 3, with the lever in a different position.

FIGS. 2, 3 and 4 show in cross-section the device according to the invention. FIG. 2 is a cross-section along the line II—II from FIG. 3, and FIG. 3 is a cross-section along the line III—III from FIG. 2. In FIGS. 2 and 3 the nipple pipe 1 is shown in the lowest position. The means 4, which ensure that the drain trough is filled to a particular desired height with water, comprise a housing 6, in which a lever 8 is attached so as to be rotatable about a shaft 7. The lever 8 comprises an arm 9, with a floating element 10, and an operating arm 11 which presses down a nipple pin 12 of the nipple 2, so that water can flow out of it. In order to ensure that the lever 8 remains in place in the center of the housing 6, the lever 8 is provided on either side with a projection 13, 14 at the point where it rotates about the shaft 7. The shaft 7 is situated on either side in a housing 6, in a vertically positioned longitudinal hole 15. This makes it possible to place the lever 8 in a bottom position (FIGS. 2 and 3) and in a top position (FIG. 4). The housing 6, with the lever 8, can be clamped round the nipple pipe, on the one hand with the aid of two projections 16, 17 and, on the other hand, with the aid of two projections 19 from an end piece 20 which also serves to fasten the trough 3 to the nipple pipe 1. A part 21 of the housing 8 falls round the nipple 2, as a result of which the lever 8 is always placed in the correct position relative to the nipple 2.

FIG. 4 shows the device according to the invention, in which the nipple pipe 1 is placed in a position higher than the bottom one. The shaft 7 about which the lever 8 rotates will be taken to the top position of the longitudinal hole 15; as a result, the arm 11, which operates the nipple 2, will be pressed against the stop 22, and the lever 8 will be put out of action. The drain trough 3 will then no longer serve as a drnking fountain, but now only as a drain trough. The nipple pipe 2, with drain trough 3, can rest in the bottom position on the bottom 23 of the cage. The nipple pipe 1 can also rest on either side on the bottom side of the groove 24 in the dividing walls 25. In order to move the nipple pipe to a higher position, the shaft 7, about which the lever 9 rotates, has fastened to it a carrying cord 26, by means of which, if the carrying cords 26 are pulled, the shaft 7 is shifted from the bottom position in the vertically placed longitudinal hole 15 to the top position, and the lever 8 will be put out of action.

In the batteries for fattening chickens and breeding chickens the nipple pipes 1 preferably run through a large number of cages. The drain trough 3 are preferably made no longer than the length of the cage through which the nipple pipe 1 runs. This means that the width of the holes in the walls of the cages need be no greater than the width of the nipple pipe 1, and in height need be no greater than the sum of the height of the nipple pipe and the distance over which it is moved to take it from the bottom to the top position. Due to the fact that with this device according to the invention it is possible to place a separate water trough in each cage, instead of a continuous water trough over the entire length of the battery, the whole battery does not need to be positioned so accurately level, something which is the case if a drinking fountain which is not divided is used over the entire length of the laying battery.

Figure 5:
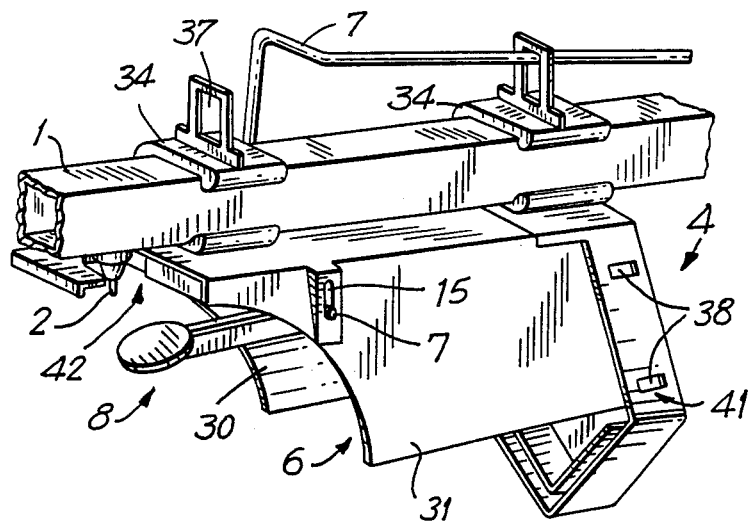
FIG. 5 shows a view of a part of a device according to the invention in a different embodiment.
Figure 6:
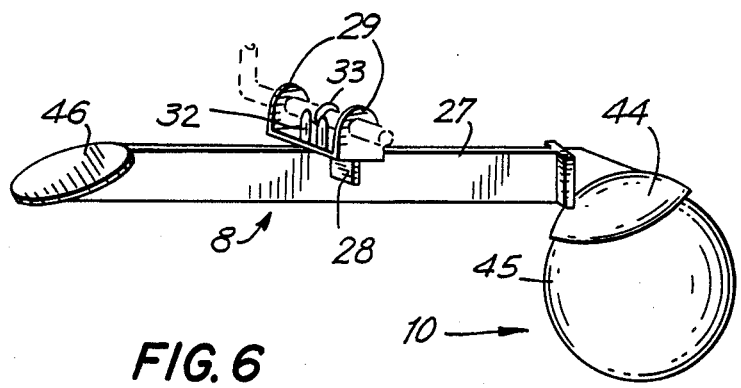
FIG. 6 shows a lever of an operating member of the device shown in FIG. 5.

FIG. 5 shows another possible embodiment of the means 4 which in the lowest position of the nipple pipe 1 fill the drain trough 3 with water to a certain desired maximum level. The means comprise an operating element 8 which holds one drinking nipple 2 in the open position. The operating element 8 in this embodiment also consist of a lever (see FIG. 6) which is preferably made largely of plastic. In this preferred embodiment the lever consist of a longitudinal bar 27, onto which a cross bar 28 is molded near the center at right angles to the longitudinal bar 27. This cross bar 28 is attached near the center to the longitudinal bar 27, and near the two ends is provided with two hooks 29 in which the shaft 7 is fastened. The shaft 7 runs trough two longitudinal holes which are disposed in the two upright walls 30 and 31 of the float housing 6. The shaft 7 can rotate freely in the two longitudinal holes 15, and the shaft can also be moved upwards or downwards over some distance in the longitudinal holes 15. Where the cross bar 28 is fastened to the longitudinal bar 27, the cross bar 28 is provided with two vertical small rods 32. Between these two rods 32 a plastic clamping ring 33 is fastened on the shaft, to prevent the lever from being shifted along the shaft 7. The housing 6 is fastened on the nipple pipe 1 by means of two clamping elements 34.

Figure 7:
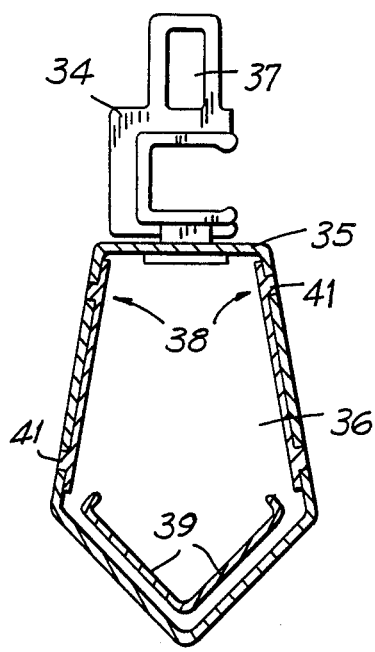
FIG. 7 shows a cross-section near the rear of the member which opens a nipple of a nipple pipe, as shown in FIG. 5.

FIG. 7 is a cross-section of the device according to the invention, near the rear of the float housing.

Fastened in the upper wall 35 of the float housing 6 is the clamping element 34; this clamping element is fastened in a hole in the upper wall 35 of the rear wall 36 and by means of rotation held tightly there in. The clamping element 34 has near one side an opening, so that it can be slid round the nipple pipe in retaining fashion. Near the top side the clamping element 34 is provided with an eye 37, which can be used for suspension and for allowing the iron brace 7 to pass through. The float housing 6 is closed off near the rear side with a rear wall 36, which the aid of holes and projections 38 can be fastened to the float housing on the two side walls 30 and 31 of the float housing. The rear wall is provided near the underside with two upright walls 39, which are joined together at an angle to each other, and which serve to support the drain trough 3. This rear wall 36 is also used together with the clamping element 34 to support the other side of the drain trough 3, while no float housing is attached to the rear wall.

Figure 8:
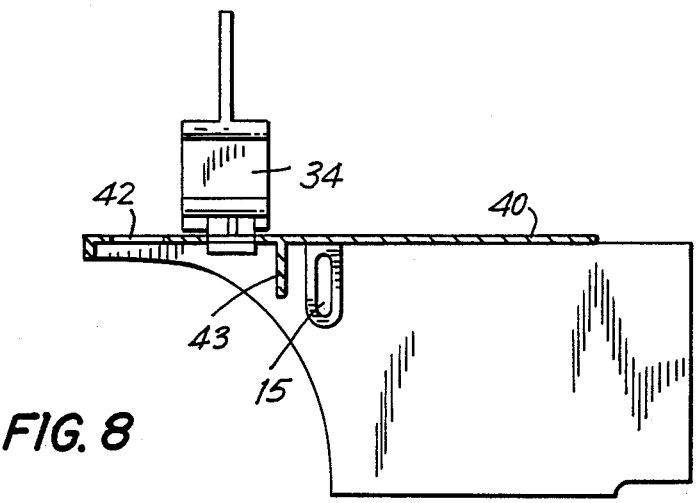
FIG. 8 shows a cross-section in the the lengthwise direction of the operating member, as shown in FIG. 5.

FIG. 8 shows a longitudinal section of the device as shown in FIG. 5 of the float housing, together with the clamping element 34. This clamping element 34 is fastened in the same way to the upper wall 40 of the float housing as the clamping element 34 to the rear wall 36. This longitudinal section shows the holes 41 into which the projections 38 fit, and a slot opening 42, through which the float housing can be slid round the nipple 2. The float housing 6 is provided on the inside over the entire width with an upright wall 43, which serves as a stop for the lever 8 and is molded on the upper wall 40 and directed downwards.

The longitudinal bar 27 is provided near one end with a bowl-shaped projection 44, to which a ping pong ball 45 can be attached, serving as a floating element 10. The other end of the longitudinal bar 27 is provided with a circular or spoon-shaped end 46, which is place at an angle with the longitudinal shaft of the longitudinal bar and serves to press on the nipple 2 to keep the latter in the open position. In the prefered embodiment this plane is directed downwards near the end, so that the water flows from the drinking nipple 2 along the plane downwards towards the end and thus drips down there. This is important to ensure that the chicks can learn how to obtain water.

I claim:

1. A water fountain, for use by emergent chicks amd maturing chickens, of the type including a water pipe and valve controlled drinking nozzles spaced above a water trough; further including;
    an actuator lever for one of said drinking nozzles; said lever being rotatable about a horizontally extending pivot rod, and having a first arm carrying a float and a second arm positioned to operate said valve controlled drinking nozzle under the control of said float in dependence on the level of water in said trough;
    a fixed stop member positioned above said second lever; and,
    means for raising said horizontally extending pivot rod from a lower position in which said valve actuator lever is operative to actuate said valve control drinking nozzle in dependence on the water level in said trough, to a raised position in which said second arm of said lever is held depressed by said stop member and is held spaced from said valve controlled drinking nozzle, thus disabling the float operation of said lever.

2. The water fountain of claim 1, in which said pivot rod extends horizontally through elongate substantially vertically extending slots in side wall members interconnecting said pipe and said trough, and is thus guided for vertical movement between said lower position and said raised position in which said lever is disabled.

3. The water fountain of claim 1, in which said second arm includes a downwardly extending portion from which water can drip upon opening of said drinking nozzle by said second arm to provide a visual indication to emergent chickens as to the source of water supply.

* * * * *